United States Patent Office 3,535,405
Patented Oct. 20, 1970

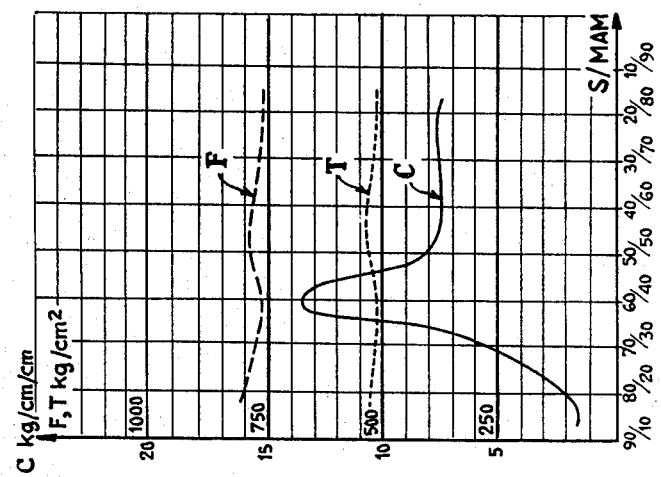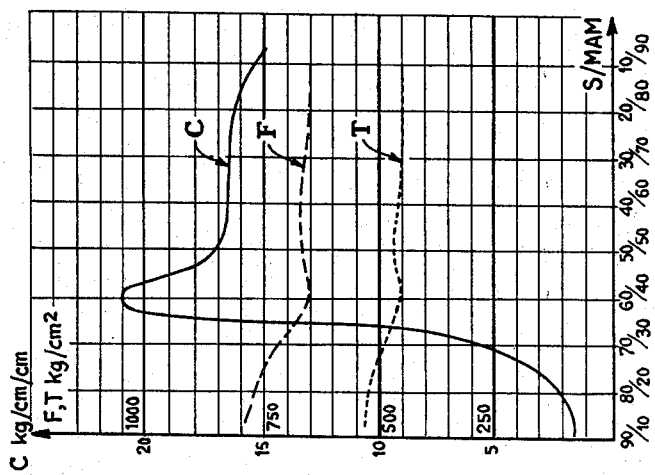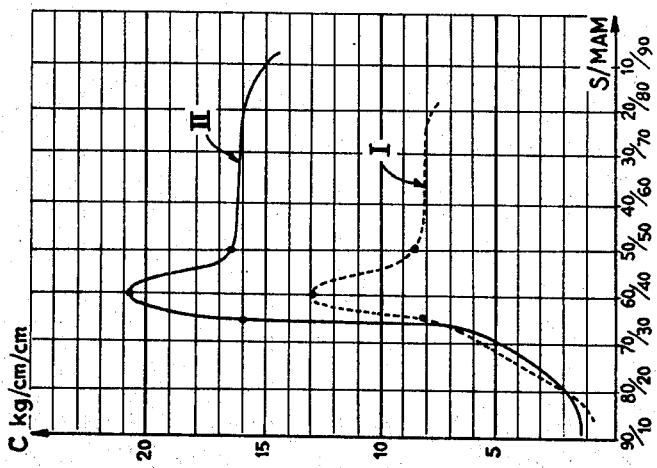

3,535,405
THERMOPLASTIC INTERPOLYMERS HAVING
ENHANCED IMPACT RESISTANCE
Ernest Fivel and Jacques Menard, Lyon, France, assignors to Plastugil, Paris, France, a French body corporate
Filed Feb. 6, 1967, Ser. No. 614,066
Claims priority, application France, Feb. 11, 1966, 49,241
Int. Cl. C08f *19/08, 19/10*
U.S. Cl. 260—880        4 Claims

ABSTRACT OF THE DISCLOSURE

Thermoplastic interpolymers having enhanced impact resistance, resulting from the interpolymerization, of a mixture of styrene and of methyl methacrylate, comprising 65 to 50 parts by weight of styrene per 35 to 50 parts by weight of methyl methacrylate, said mixture containing, in addition, a minor amount of elastomer relative to the monomers such that the final interpolymers contain up to 30% by weight of elastomer, said interpolymerization being carried out by passing said mixture continuously between two diathermic walls in the form of a thin layer at a constant temperature.

---

The present invention relates to thermoplastic interpolymers resulting from the copolymerization of styrene and methyl methacrylate in the presence of an elastomer.

Interpolymers of such type are already known. In particular, such interpolymers are described in U.S. patent application 539,898 filed Apr. 4th, 1966, and assigned to the same assignee. The latter interpolymers exhibit very good physical characteristics, due to the process used for their preparation.

This process is a continuous mass polymerization process, wherein the constituents to be interpolymerized are passed continuously between two diathermic walls in the form of a thin layer, during fifteen minutes to three hours, and preferably during about one hour, at a constant reaction temperature such that the product exhibits molecular size characteristics which make it readily utilizable and that the corresponding reaction speed insures a conversion rate of at least 30%—and preferably comprised within the range of 30 to 80%—into polymer, during the time of the reaction.

Such polymerization conditions, owing to an efficient control of the reaction exothermy, result in a product having very narrow composition and molecular weight distribution, which explains its excellent performance characteristics.

Advantageously, this process is carried out in a screw type apparatus or polymerizer constituted by two concentric cylinders spaced apart by a 20–40 mm. ring-shaped clearance in which are passed the constituents to be interpolymerized, driven by the screw with which the inner cylinder is provided.

While the styrene, methyl methacrylate and elastomer interpolymers described in the aforesaid patent application have, generally, very good physical characteristics, it has now been found that a limited family of such interpolymers, undescribed heretofore, is characterized by an exceptional and unexpected impact resistance while the other physical characteristics are not appreciably affected thereby.

In view of this impact resistance property, the new interpolymers of this family are most useful industrial products within the scope of the invention.

These new interpolymers are those resulting from the interpolymerization of a mixture of styrene and methyl methacrylate monomers comprising 65–50 parts by weight of styrene per 35–50 parts by weight of methyl methacrylate, this mixture containing, in addition, a minor amount of elastomer with respect to the monomers that may comprise up to 30% by weight of the final interpolymer.

The exceptional impact resistance properties of the new interpolymers are due to the relative proportions of styrene and methyl methacrylate and, although to a lesser extent, to the proportion of elastomer relative to the total of both monomers. Said properties are also influenced by the interpolymerization process used, the best results being obtained when the aforesaid continuous mass interpolymerization process is used. This process is, therefore, preferred, and reference will only be made to this process hereinunder. Since, however, this process is already described in United States Pat. 3,141,868 and in the aforesaid U.S. patent application, details relating thereto will be given here only to the extent necessary for the understanding of the present invention.

The characteristics of the interpolymers according to the invention will now be further examined.

As mentioned above, styrene and methyl methacrylate should be present in the relative weight ratio of 65–50 parts per 35–50 parts. Within this range, optimum results are obtained, with a most marked maximum at a relative ratio of 60 parts of styrene and 40 parts of methyl methacrylate.

The percentage of elastomer present has also an influence on the impact resistance of the resulting interpolymer, although to a less noticeable extent. Thus, all other things being equal, the impact resistance increases gradually with increasing ratio of elastomer in the final interpolymer, up to about 20%. Beyond this value, and although there may be used up to 30% of elastomer, the impact resistance reaches a level value. Since, on the other hand, the impact resistance obtained is particularly valuable from about 8% of elastomer, it is preferred to use 8–20% of elastomer in the final product. Many elastomers have been tested and have all given good results. It is only for reacons of ready availability and of economics that the butadiene homo- and copolymers—such as SBR rubber containing 77% of butadiene and 23% of styrene—are preferred. It is recommended to use elastomers having a minimum inorganic ash content, such as those prepared by a solution process which are more readily utilizable. The introduction of the elastomer in the polymerization mixture is preferably effected by dissolution or dispersion in the monomer mixture.

The polymerization conditions are, generally, those of the above defined process, a screw type polymeriser being used. The reaction time is comprised within the range of from fifteen minutes to three hours and is preferably equal to about one hour. A constant temperature of 160 to 185° C. is maintained during the reaction. As to the monomer conversion rate, it usually varies from 40 to 70% and preferably from 50 to 60%. This conversion rate should be taken into consideration when determining the ratio of elastomer to be introduced in the original mixture with respect to the ratio of elastomer desired in the final interpolymer. Thus, for example, when a 10% ratio of elastomer is desired in the final interpolymer, 5% of elastomer will have to be introduced initially in the monomer mixture for a conversion rate of 50% prior to removal by volatilization of the unreacted monomers, and 6% of elastomer will have to be introduced for a conversion rate of 60%.

The experiments reported below in relation with the corresponding curves which are reproduced in the accompanying drawing, illustrate the invention and confirm the results set forth above.

Eight series of tests are summarized in Table I below, such tests using varying styrene/methyl methacrylate (S/MAM) ratios. In each series, the physical properties of the interpolymers obtained with one or more given elastomer contents are reported.

various mixtures of styrene and of methyl methacrylate in which it is dissolved, has the following properties:

When the styrene/methylmethacrylate ratio is high, within the range 90/10 and 65/35, the impact resistance

TABLE I

| Test series | S/MAM ratio | Elastomer, percent | Flexural strength, kg./cm.$^2$ | Tensile strength, kg./cm.$^2$ | Tensile elongation, percent | Notched Izod impact, kg./cm./cm. | Rockwell hardness scale M | Heat distortion point, °C. |
|---|---|---|---|---|---|---|---|---|
| 1 | 10/90 | 13.1 | 641 | 457 | 22.6 | 13.7 | 83 | 86 |
| 2 | 20/80 | 13.4 | ---- | 473 | 18.3 | 14.4 | 81 | 92 |
| 3 | 30/70 | 14.5 | 637 | 457 | 17.8 | 16.5 | 76 | 89 |
| 4 | 40/60 | 10 | 756 | 511 | 14.7 | 8.92 | 79 | 91 |
|  |  | 12.1 | 774 | 522 | 15.7 | 12.03 | 81 | 91 |
|  |  | 13.8 | 691 | 476 | 18.8 | 15 | 77 | 92 |
|  |  | 14.5 | 665 | 449 | 21.1 | 17.2 | 71 | 92 |
|  |  | 17.7 | 678 | 471 | 20.3 | 17.1 | 76 | 92 |
| 5 | 50/50 | 10 | 776 | 526 | 14.7 | 8.4 | 74 | 90 |
|  |  | 14.5 | 690 | 472 | 12.4 | 15.8 | 71 | 87.5 |
| 6 | 60/40 | 10 | 767 | 504 | 13.4 | 13.8 | 72 | 90 |
|  |  | 14.5 | 641 | 451 | 11.4 | 21.2 | 67 | 88 |
|  |  | 16.6 | 585 | 408 | 19.9 | 22.9 | 63 | 87 |
| 7 | 70/30 | 10 | 757 | 509 | 9.1 | 5.69 | 69 | 88 |
|  |  | 14.5 | 736 | 494 | 9.2 | 5.35 | 67 | 88 |
| 8 | 80/20 | 10 | 793 | 514 | 8.3 | 1.89 | 72 | 89 |
|  |  | 14.5 | 754 | 498 | 8.5 | 1.82 | 69 | 88 |

For illustrative purposes, the interpolymers of these series of tests were obtained as follows:

(1) Test series 1–5

This series includes the monomer compositions having a high methyl methacrylate content. The styrene/methyl methacrylate ratio varies within the range of 10/90 to 50/50. The SBR type elastomer is dissolved in an amount of 5–7% in the previously adjusted monomer mixture. Polymerization is carried out at a temperature within the range of 185° C. in the first test, to 170° C., in the fifth test. The polymerization time is comprised within one hour and fifty minutes. The conversion rate varies from 45%, in the first test, to 55% in the fifth test.

Good stability of the mechanical properties is noted in all five tests. With an average elastomer content of 14%, the notched Izod impact value is stable and at a level comprised between 14 and 16 kg./cm./cm.

(2) Test series 6

When passing from series 5 to series 6, the azeotropic composition is passed. With the composition styrene/methyl methacrylate 60/40, polymerisation is carried out in the same manner as described for test series 1–5, however, at a temperature of 165° C. The tests were effected with an elastomer content varying from 5 to 8.5% in the feed. The conversion rate is of the order of 50%.

The interpolymer has a styrene/methyl methacrylate ratio slightly below 60/40 and thus tends to approximate the azeotropic composition.

The elastomer content of the interpolymer varies from 10 to 16.6%.

In all of these tests, an enhanced notched Izod impact value, accompanied by a slight decrease of the flexural strength, of the tensile strength and of hardness, is observed.

(3) Test series 7–8

These tests describe styrene-enriched compositions. The styrene/methyl methacrylate ratio is 70/30 and 80/20. The polymerization is carried out under the same conditions as previously, at a temperature of 160° C., in the presence of an elastomer amount of 5 to 7.5% and at a conversion rate of 45%. The resulting products, of satisfactory molecular characteristics, exhibit a total collapse of the impact resistance properties. The value of the notched Izod impact dropping down to 5 for the 70/30 styrene/methyl methacrylate ratio and below 2 for the 80/20 ratio.

The following general comments may be made from inspection of Table I:

(A) At a given percentage of elastomer, the interpolymer resulting after copolymerization of this elastomer with is very poor, however, from a ratio of 65/35, this resistance increases in spectacular fashion, passes by a maximum when the styrene/methyl methacrylate ratio is 60/40, and decreases subsequently until the 50/50 ratio is reached, from which a level value is established:

The flexural and tensile strength values, which are high for the higher styrene/methyl methacrylate ratios, decrease in regular fashion until a minimum is reached which is precisely that of the 60/40 styrene/methyl methacrylate ratio, increase slightly thereafter and tend to remain at a level value. However, the overall decrease of these properties is relatively low (of the order of 10–15%) for an extremely substantial increase of the impact resistance property (of the order of 1000%).

FIG. 1 is a graph illustrating the variation of the notched Izod impact (C) plotted along the ordinate in kg./cm./cm. as a function of the styrene/methyl methacrylate (S/MAM) ratio plotted along the abscissa for percentages of 10% (curve I) and of 14.5% (curve II), respectively, of SBR rubber in the interpolymer.

FIG. 2 is a graph illustrating the variation of impact resistance (C), flexural strength (F) and tensile strength (T) plotted along the ordinate as a function of the S/MAM ratio plotted along the abscissa, for an interpolymer containing 14.5% of SBR rubber.

FIG. 3 is a graph similar to that of FIG. 2 for an interpolymer containing 10% of SBR rubber.

From the combined data given by all three figures, the particular properties obtained in the area wherein the styrene/methyl methacrylate monomer ratio varies from 65/35 to 50/50 by weight become apparent, and the point of inflexion—in one direction or the other—of the various properties may be determined with great precision, said point corresponding to the styrene/methyl methacrylate ratio of 60/40.

(B) At a given styrene/methyl methacrylate ratio, the interpolymer obtained after copolymerization of the monomer mixture with a varying percentage of elastomer has the following properties:

The impact resistance increases regularly with increasing percentage of elastomer, to a lesser degree, however, from a percentage of elastomer higher than 20%. Conversely, the tensile and flexural strengths decrease regularly and also tend to reach a level value above this percentage of elastomer. The decrease of these properties of flexural and tensile strength is relatively low (of the order of 10 to 20%), while the increase of the impact resistance is more substantial (of the order of 50 to 100%), this being dependent on the basic styrene/methyl methacrylate ratio involved.

Figure 5:
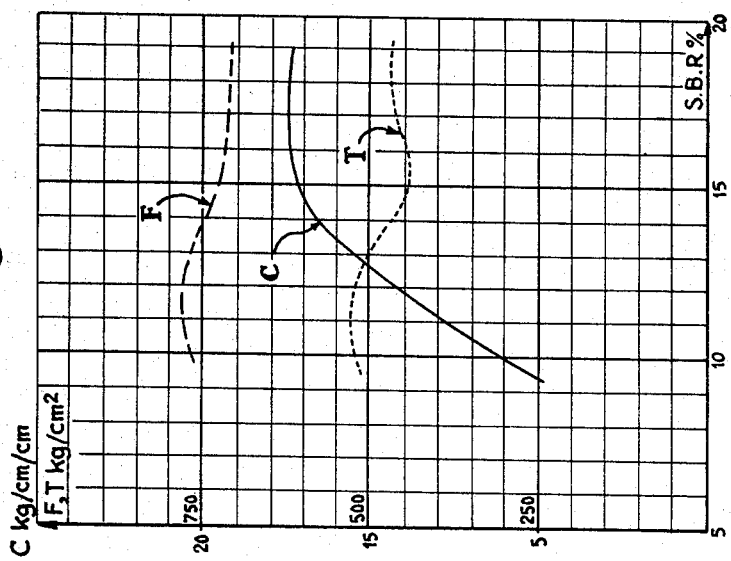
Figure 4:
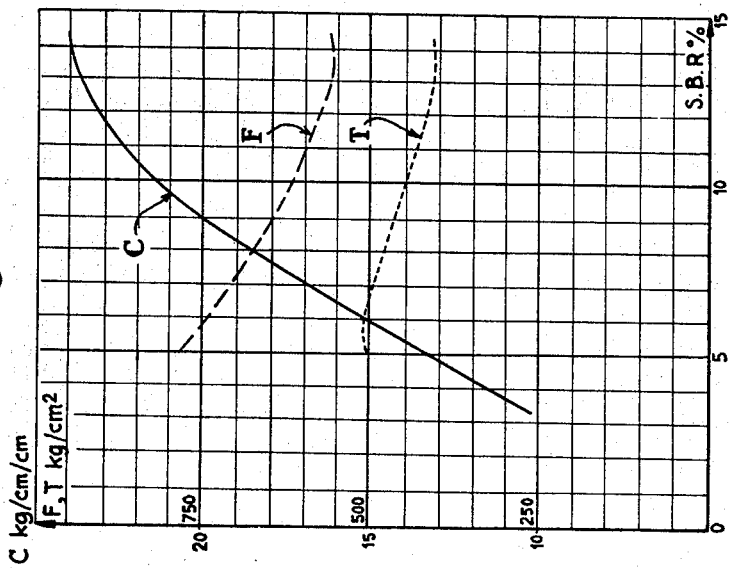

FIGS. 4 and 5 illustrate graphically the above data. On these graphs, the C, F and T strength values have been plotted along the ordinate as a function of the percentage of SBR rubber (plotted along the abscissa) in two interpolymers: the first (FIG. 4) having a S/MAM ratio of 60/40 and the second (FIG. 5) having a S/MAM ratio of 40/60, i.e., outside the scope of the invention. The course followed by the various properties is normal in the composition having a styrene/methyl methacrylate ratio of 40/60 which exhibits correct, although non-enhanced, impact resistance properties.

The course followed is more surprising in the case of the styrene/methyl methacrylate ratio of 60/40 (FIG. 4) since, due to the extremely markedly enhanced impact resistance properties, one could have feared that, as a counterpart, the tensile and flexural strengths might exhibit a characteristic collapse. Nothing of the kind is found to occur and this is another point to the credit of the interpolymers having a styrene/methyl methacrylate ratio of 60/40 and, more generally, of those containing 65 to 50 parts of styrene per 35 to 50 parts of methyl methacrylate which are contemplated within the scope of the present invention.

In this field, there are obtained very markedly enhanced impact resistance properties which increase further, although less markedly, with the percentage of elastomer used. On the other hand, this increase is not followed by a substantial decrease of the other properties, this in spite of the increase of the percentage of elastomer, these properties having also a tendency to become established at level values above 20% of elastomer.

Although specific embodiments of the invention have been described for illustrative purposes, many modifications and changes may be made therein without departing from the scope of the invention as defined in the appended claims.

Having now described our invention what we claim as new and desire to secure by Letters Patent is:

1. Thermoplastic interpolymers having enhanced impact resistance, resulting from the interpolymerization of a mixture of styrene and of methyl methacrylate, comprising 65 to 50 parts by weight of styrene per 35 to 50 parts by weight of methyl methacrylate, said mixture containing, in addition, an elastomer selected from butadiene and butadiene-styrene elastomers in an amount such that the final interpolymers contain from 8 to 20% by weight of elastomer, said interpolymerization being carried out by passing said mixture continuously between two diather walls in the form of a thin layer at a constant temperature of 160 to 185° C., during a time of fifteen minutes to three hours, with a reaction speed insuring a conversion ratio of 40 to 70% into interpolymer during the time of the reaction, and devolatilizing the unreacted monomers so as to separate said interpolymer.

2. Interpolymers as claimed in claim 1, wherein the reaction time is about one hour.

3. Interpolymers as claimed in claim 6, wherein the conversion ratio is 50–60% during the time of the reaction.

4. Interpolymers as claimed in claim 1, wherein the weight ratio of the styrene/methyl methacrylate monomers is about 60/40.

References Cited

UNITED STATES PATENTS

| 3,040,013 | 6/1962 | Kuhn. | |
| 3,141,868 | 7/1964 | Fivel | 260—85.5 |
| 3,178,489 | 4/1965 | Lunk et al. | 260—880 |

FOREIGN PATENTS

| 924,873 | 5/1963 | Great Britain. |

MURRAY TILLMAN, Primary Examiner

C. J. SECCURO, Assistant Examiner

U.S. Cl. X.R.

260—95